United States Patent
Liu et al.

(10) Patent No.: US 10,019,404 B2
(45) Date of Patent: Jul. 10, 2018

(54) ACCESSING METHOD FOR ACCESSING HYBRID HARD-DISK DRIVE

(71) Applicant: ALLONE SOLUTION CO., LTD., Hsinchu (TW)

(72) Inventors: Shu-Min Liu, Hsinchu (TW); Ssu-Wen Hung, Hsinchu (TW)

(73) Assignee: ALLONE SOLUTION CO., LTD., Hsinchu (TW)

( * ) Notice: Subject to any disclaimer, the term of this patent is extended or adjusted under 35 U.S.C. 154(b) by 204 days.

(21) Appl. No.: 15/134,377

(22) Filed: Apr. 20, 2016

(65) Prior Publication Data

US 2017/0308501 A1    Oct. 26, 2017

(51) Int. Cl.
  G06F 13/36  (2006.01)
  G06F 13/42  (2006.01)
  G06F 3/06   (2006.01)
  G06F 13/28  (2006.01)

(52) U.S. Cl.
  CPC ........ G06F 13/4286 (2013.01); G06F 3/0611 (2013.01); G06F 3/0659 (2013.01); G06F 3/0685 (2013.01); G06F 13/28 (2013.01)

(58) Field of Classification Search
  CPC .... G06F 13/4286; G06F 13/28; G06F 3/0611; G06F 3/0685; G06F 3/0659
  See application file for complete search history.

(56) References Cited

U.S. PATENT DOCUMENTS

| | | | |
|---|---|---|---|
| 2006/0015683 A1* | 1/2006 | Ashmore | G06F 1/3203 711/113 |
| 2008/0177952 A1* | 7/2008 | Morrow | G06F 12/121 711/133 |
| 2008/0189484 A1* | 8/2008 | Iida | G06F 11/1441 711/114 |
| 2014/0379988 A1* | 12/2014 | Lyakhovitskiy | G06F 12/12 711/133 |
| 2016/0246724 A1* | 8/2016 | Boehm | G06F 12/0804 |

* cited by examiner

Primary Examiner — Jing-Yih Shyu
(74) Attorney, Agent, or Firm — Chun-Ming Shih; HDLS IPR Services

(57) ABSTRACT

An accessing method for accessing a hybrid hard-disk drive (HDD) including a main storage and a cache storage is provided. When receiving data, the HDD directly writes the data to the cache storage. The HDD determines whether the capacity of saved data in the cache storage exceeds a threshold capacity, and controls the cache storage to synchronously write exceeding part of the saved data to the main storage. When the cache storage is full, the HDD deletes synchronized data of the cache storage for refreshing the cache storage and writes new incoming data to the refreshed cache storage.

9 Claims, 6 Drawing Sheets

ACCESSING METHOD FOR ACCESSING HYBRID HARD-DISK DRIVE

BACKGROUND OF THE INVENTION

1. Field of the Invention

The invention relates to a hybrid hard disk drive (HDD), and in particularly to an accessing method of the hybrid HDD.

2. Description of Prior Art

By using the current electronic devices, users have to store digital data through hard disk drives (HDDs).

In particularly, the average number of IOPS (input/output operations per second) of regular magnetic HDDs with 7200 revolution per minute (RPM) in random accessing process is about 75 IOPS to 100 IOPS, and the average number of IOPS of solid state disks (SSDs) in random accessing process is about 20K IOPS to 100K IOPS. Because the average number of IOPS of SSDs is higher than that of regular magnetic HDDs, the regular magnetic HDDs are phased out eventually.

The aforementioned SSDs are basically composed of non-volatile memories. However, the accessing efficiency of volatile memories is much higher than that of the non-volatile memories. Taking double data rate synchronous dynamic random access memory (DDR SDRAM) for an instance, the average number of IOPS of DDR SDRAM in random accessing process is about 200 K IOPS to 260K IOPS.

Accordingly, someone in the market provided hybrid HDDs that are composed of SSDs (or HDDs) and DDR SDRAMs, and this kind of hybrid HDDs have the fastest data accessing speed that is much faster than that of traditional single SSD and magnetic HDD.

When receiving user operations, the current hybrid HDDs usually write the incoming data to the DDR SDRAM in order to get a fast writing speed. Then, the hybrid HDDs write the data inside the DDR SDRAM to the SSD before the power is cutting out, so as to keep the data exist after losing the power.

However, as data amount increasing, the capacity of the DDR SDRAM of the current hybrid HDDs is not enough frequently, and in such case, the controller of the current hybrid HDDs needs to write the incoming data to the SSD instead. Therefore, the writing speed/reading speed of the current hybrid HDDs decreases, and it causes the terrible experience to the users.

SUMMARY OF THE INVENTION

The main object of the present invention is to provide an accessing method for accessing hybrid hard-disk drive (HDD), which can reduce accessing frequency from host to main storage, and increase accessing speed of the entire hybrid HDD.

To achieve the above object, the present invention discloses an accessing method for accessing hybrid HDD, wherein the hybrid HDD comprises a main storage and a cache storage. When receiving data from the host, the HDD directly writes the data to the cache storage. The HDD determines whether the capacity of saved data in the cache storage exceeds a threshold capacity, and controls the cache storage to synchronously write exceeding part of the saved data to the main storage.

When the cache storage is full, the HDD deletes synchronized data of the cache storage for refreshing the cache storage, and then writes new incoming data to the refreshed cache storage.

The present invention retains part of saved data in the cache storage that is within the threshold capacity and not to synchronize these data to the main storage, so the writing frequency of the main storage is reduced and the life of the main storage is extended. Besides, the present invention synchronizes exceeding part of saved data in the cache storage to the main storage, so the hit rate that the synchronized data exist in the cache storage increases (i.e., the rate that data can be written to the cache storage (so called writing hit rate) increases), and the accessing speed of the entire hybrid HDD is upgraded.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
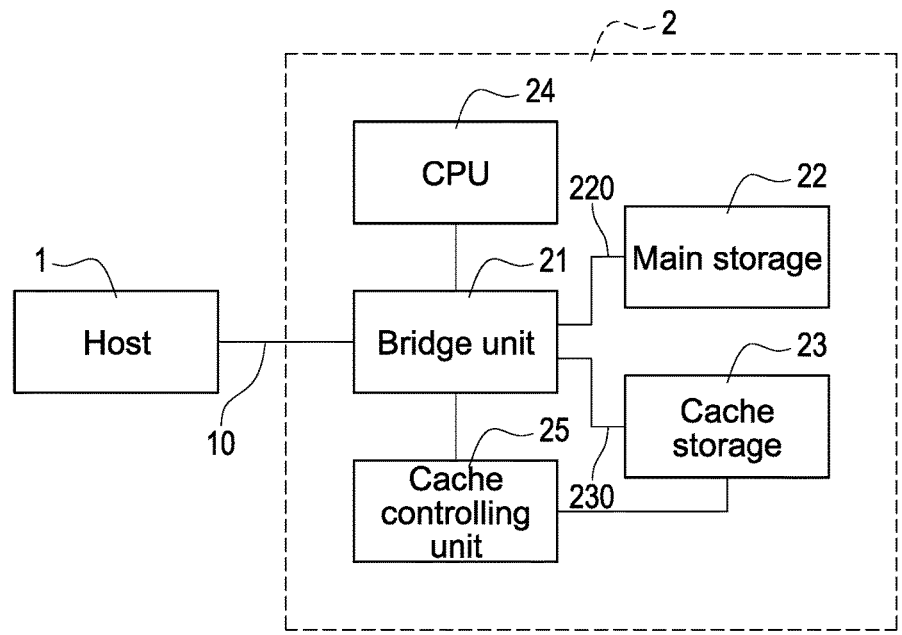
FIG. 1 is a block diagram of hybrid HDD of a first embodiment according to the present invention.

FIG. 1 is a block diagram of hybrid HDD of a first embodiment according to the present invention. The present invention discloses an accessing method for accessing hybrid hard-disk drive (HDD), and the accessing method (refers to as the method hereinafter) is adopted in a hybrid HDD 2 as shown in FIG. 1.

The hybrid HDD 2 comprises a bridge unit 21, a main storage 22 and a cache storage 23. The main storage 22 can be a magnetic hard-disk drive (HDD) or a solid state disk (SSD), and the cache storage 23 is composed of volatile memories. In particularly, the cache storage 23 is composed of double data rate synchronorus dynamic random access memories (DDR SDRAMs), but not limited thereto.

The bridge unit 21 is connected with an external host 1 through a main bus 10, and is connected with the main storage 22 and the cache storage 23 respectively through two device buses 220, 230. The bridge unit 21 receives data transmitted from the host 1 and respectively writes the received data to the main storage 22 or the cache storage 23 through the two device buses 220, 230. In this embodiment, the main bus 10 and the two device buses 220, 230 are serial advanced technology attachment (SATA) buses, but not limited thereto.

The hybrid HDD 2 further comprises a central processing unit (CPU) 24 and a cache controlling unit 25. The bridge unit 21, the CPU 24 and the cache controlling unit 25 in this embodiment can be integrated into a single integrated circuit (IC), but not limited thereto.

The CPU 24 is electrically connected with the bridge unit 21. In this embodiment, the CPU 24 notifies the bridge unit 21 the addresses of any kind of data. Therefore, when receiving data or commands transmitted from the host 1 and through the main bus 10, the bridge unit 21 can determine that it needs to write the receive data to the main storage 22 or the cache storage 23, and it needs to read the main storage 22 or the cache storage 23 for data searching according to the received commands.

In the present invention, the writing speed of the cache storage 23 is much faster than that of the main storage 22, as a result, the bridge unit 21 will keep writing data to the cache storage 23 before the cache storage 23 is full in order to get the best writing speed of the hybrid HDD 2. Besides, the reading speed of the cache storage 23 is also much faster than that of the main storage 22, so if the host 1 can have higher rate to find necessary data in the cache storage 23 (i.e., the hit rate is high), the hybrid HDD 2 can reach faster reading speed.

The cache controlling unit 25 is connected to the cache storage 23, and is used to control the cache storage 23 to synchronously store saved data of the cache storage 23 to the main storage 22. Also, the cache controlling unit 25 is used to control the cache storage 23 to delete part of synchronized data of the cache storage 23 (detailed described in the following).

Figure 2A:
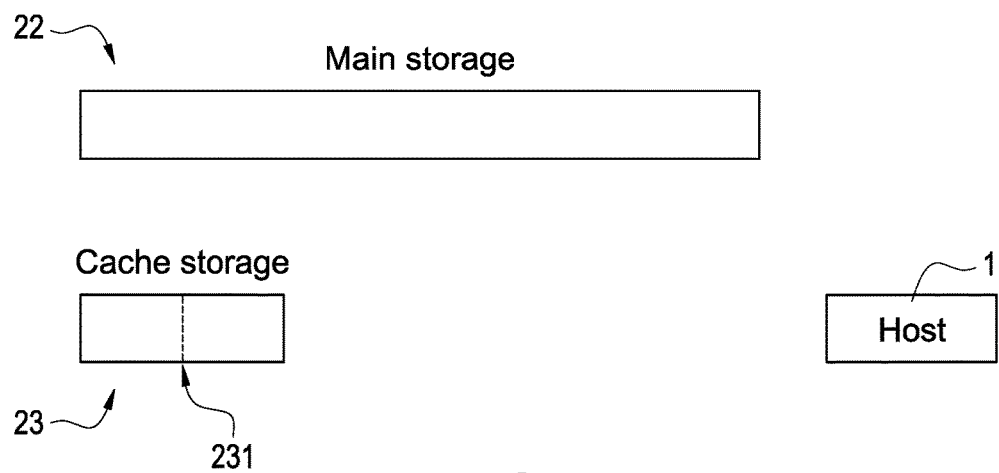
FIG. 2A is a first schematic view showing data writing of a first embodiment according to the present invention.
Figure 2B:
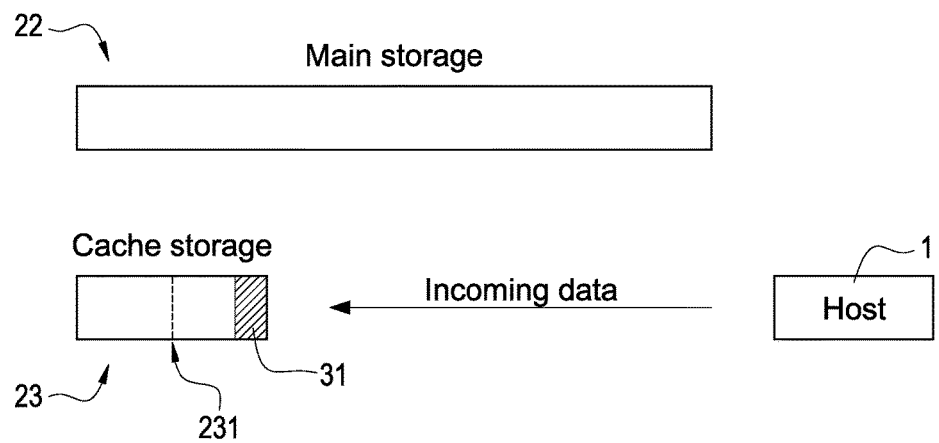
FIG. 2B is a second schematic view showing data writing of the first embodiment according to the present invention.
Figure 2C:
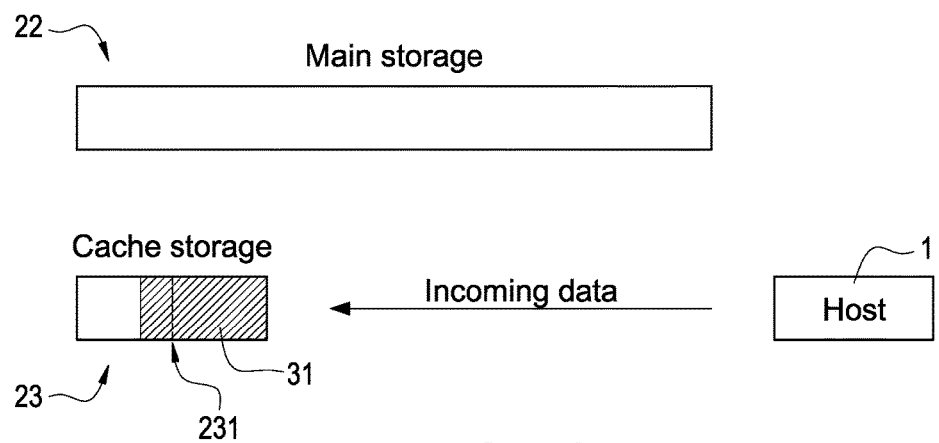
FIG. 2C is a third schematic view showing data writing of the first embodiment according to the present invention.
Figure 2D:
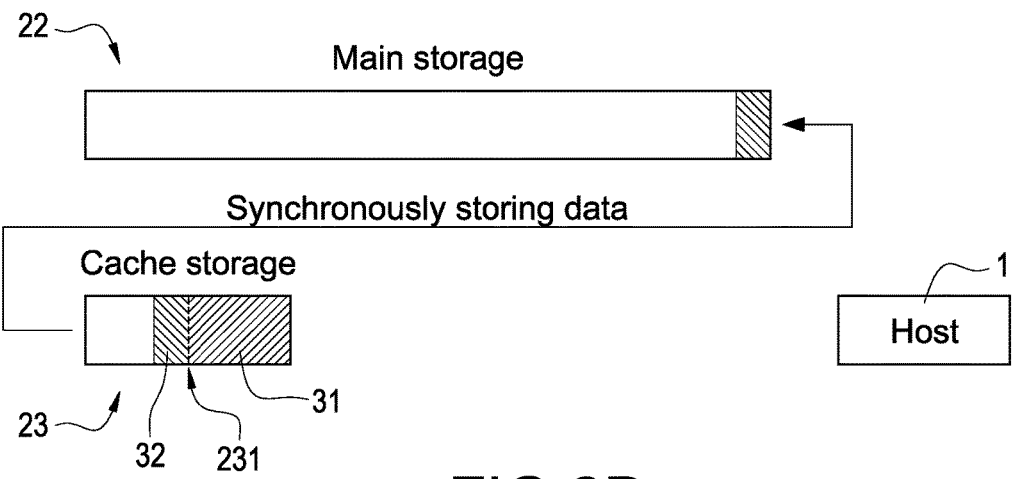
FIG. 2D is a fourth schematic view showing data writing of the first embodiment according to the present invention.
Figure 2E:
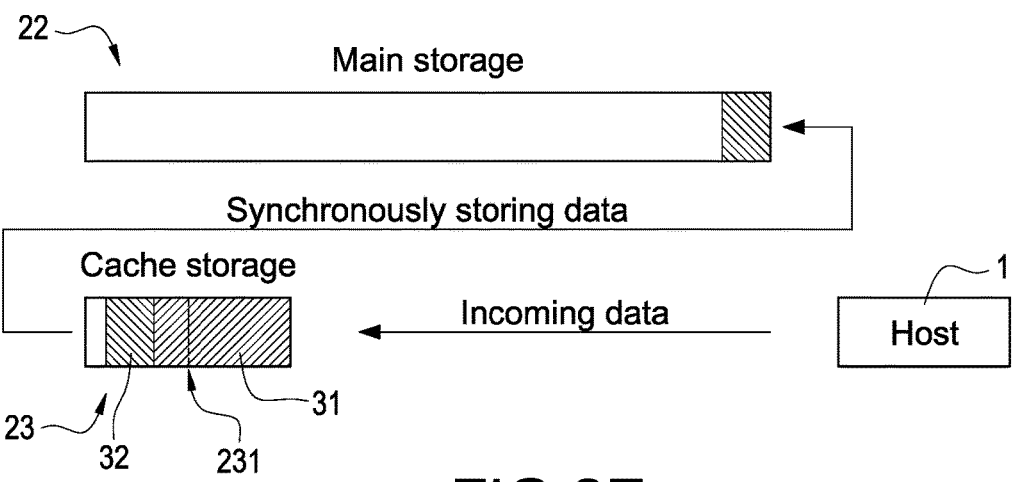
FIG. 2E is a fifth schematic view showing data writing of the first embodiment according to the present invention.

Please refer to FIG. 2A to FIG. 2E, wherein FIG. 2A is a first schematic view showing data writing of a first embodiment according to the present invention, FIG. 2B is a second schematic view showing data writing of the first embodiment according to the present invention, FIG. 2C is a third schematic view showing data writing of the first embodiment according to the present invention, FIG. 2D is a fourth schematic view showing data writing of the first embodiment according to the present invention, and FIG. 2E is a fifth schematic view showing data writing of the first embodiment according to the present invention.

As shown in FIG. 2A, in the present invention, the cache storage 23 is preset with a threshold capacity 231. In a preferred embodiment, the threshold capacity 231 is half of a total capacity of the cache storage 23, and the total capacity of the cache storage 23 is a quarter of a total capacity of the main storage 22. For an instance, if the main storage 22 is a SSD with 256 GB capacity, then the cache storage 23 can be a DDR SDRAM with 64 GB capacity, and the threshold capacity 231 can be preset as 32 GB. However, the above description is just a preferred embodiment, but not intended to limit the scope of the present invention.

As shown in FIG. 2B, when receiving incoming data from the host 1, the hybrid HDD 2 first writes the received data to the cache storage 23, so as to transform the received data into saved data 31 of the cache storage 23.

As shown in FIG. 2C, before the cache storage 23 is full, the hybrid HDD 2 keeps writing the incoming data, which is received from the host 1, directly to the cache storage 23. And as shown in FIG. 2D, when the capacity of the saved data 31 in the cache storage 23 exceeds the threshold capacity 231, the hybrid HDD 2 controls the cache storage 23, through the cache controlling unit 25, to synchronously store the exceeding part of the saved data 31 to the main storage 22, so as to transform the exceeding part of saved data 31 into synchronized data 32 of the cache storage 23.

Next, as shown in FIG. 2E, during the time the cache storage 23 synchronously stores the exceeding part of the saved data 31 to the main storage 22, the hybrid HDD 2 can keep receiving the incoming data from the host 1 and writing them to the cache storage 23. In other words, the actions of creating the saved data 31 and creating the synchronized data 32 can be executed simultaneously.

It should be mentioned that in this embodiment, the cache storage 23 only synchronously stores part of the saved data 31 that exceeds the threshold capacity 231 to the main storage 22 to transform them into the synchronized data 32 of the cache storage 23. For instance, if the capacity of the cache storage 23 is 64 GB and the threshold capacity 231 is preset as 32 GB, then the cache storage 23 will not synchronously store any of the saved data 31 therein to the main storage 22 before the capacity of the saved data 31 exceeds 32 GB. If the capacity of the saved data 31 in the cache storage 23 is 33 GB, the cache storage 23 only synchronously stores the oldest 1 GB data of the saved data 31 to the main storage 22, and the rest of the 32 GB saved data 31 is not going to be written to the main storage 22 at the time.

In the present invention, since the synchronized data 32 of the cache storage 23 already exists in the main storage 22, the hybrid HDD 2 will delete part of the synchronized data 32 of the cache storage 23 for refreshing the cache storage 23 when the cache storage 23 is full. Therefore, the new incoming data can still be written to the refreshed cache storage 23.

Figure 3:
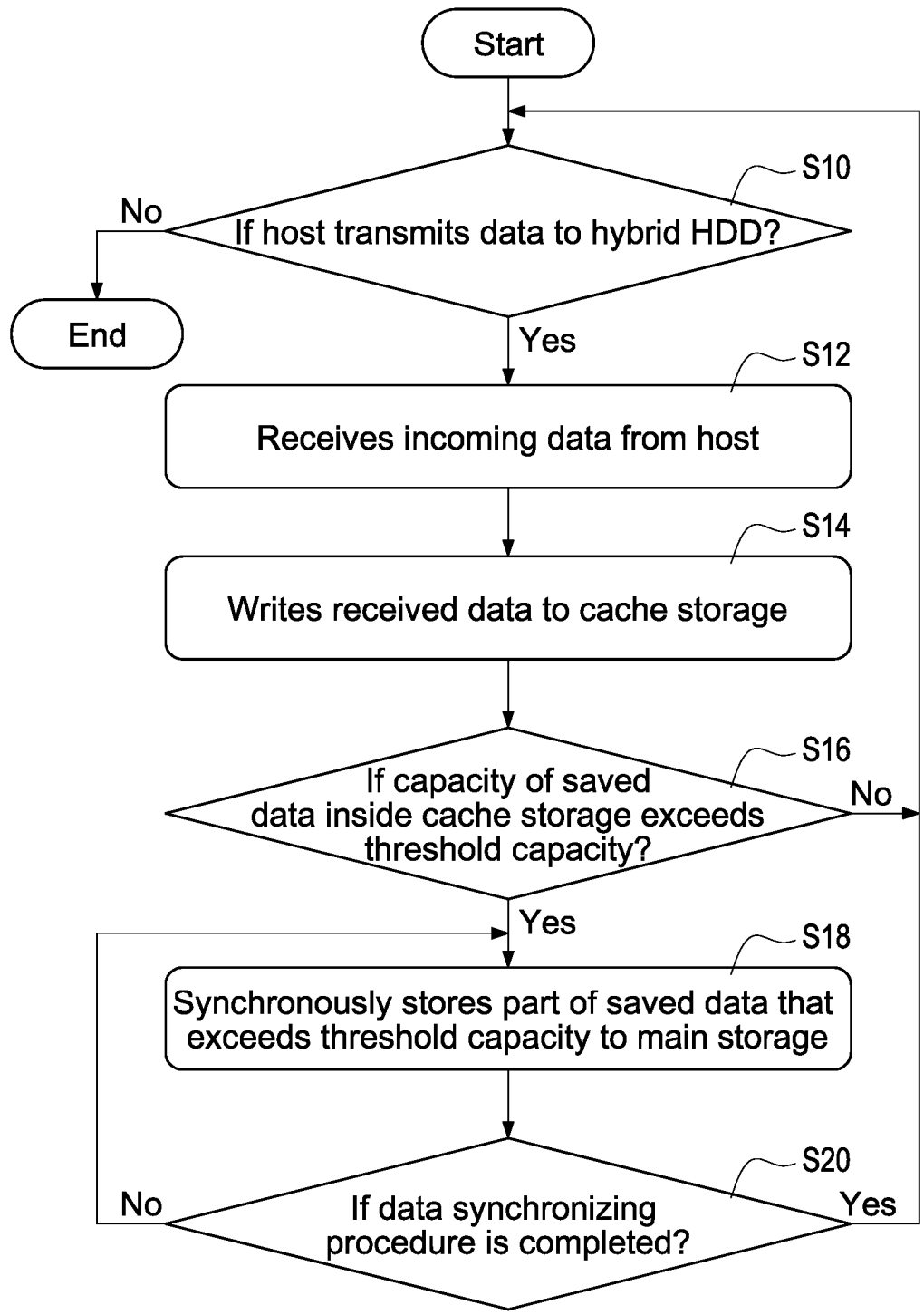
FIG. 3 is an accessing flowchart of cache storage of a first embodiment according to the present invention.

FIG. 3 is an accessing flowchart of cache storage of a first embodiment according to the present invention. The method disclosed in the present invention is adopted by the hybrid HDD 2 disclosed in FIG. 1 and comprises the following steps.

First, the hybrid HDD 2 determines whether the host 1 wants to transmit data to the hybrid HDD 2 (step S10), and receives the incoming data from the host 1 through the bridge unit 21 when the host 1 does have data to transmit (step S12). Next, the hybrid HDD 2 directly writes the received data to the cache storage 23 (step S14). In this embodiment, the bridge unit 21 receives the incoming data through the main bus 10, and writes the received data to the cache storage 23 through the device bus 230.

At the time the received data are written to the cache storage 23, the hybrid HDD 2 determines through the cache controlling unit 25 if the capacity of the saved data 31 inside the cache storage 23 exceeds the threshold capacity 231 or not (step S16). If the capacity of the saved data 31 not exceeds the threshold capacity 231 yet, the cache controlling unit 25 does nothing to the data inside the cache storage 23, the method goes back to the step S10 and the hybrid HDD 2 keeps determining if the host 1 has further data to transmit, and writes the received data to the cache storage 23 to transform the received data into part of the saved data 31.

If the capacity of the saved data 31 is determined to exceed the threshold capacity 231, the cache controlling unit 23 controls the cache storage 23 to synchronously store part of the saved data 31 that exceeds the threshold capacity 231 (i.e., the exceeding part) to the main storage 22 (step S18), so as to transform the exceeding part of the saved data 31 into part of the synchronized data 32 of the cache storage 23.

After the step S18, the hybrid HDD 2 determines, through the cache controlling unit 25, if a data synchronizing procedure, which synchronously stores the exceeding part of the saved data 31 of the cache storage 23 to the main storage 22, is completed (step S20). If the data synchronizing procedure is not completed, the method goes back to the step S18 and the hybrid HDD 2 keeps executing the data synchronizing procedure. If the data synchronizing procedure is completed, the method goes back to the step S10 and the hybrid HDD 2 keeps determining if the host 1 has further data to transmit.

It should be mentioned that the cache storage 23 can execute the data synchronizing procedure and a data writing procedure (that accepts the received data to be written in) at the same time, until the exceeding part of the saved data 31 is completely written to the main storage 22 and transformed into part of the synchronized data 32.

Figure 4:
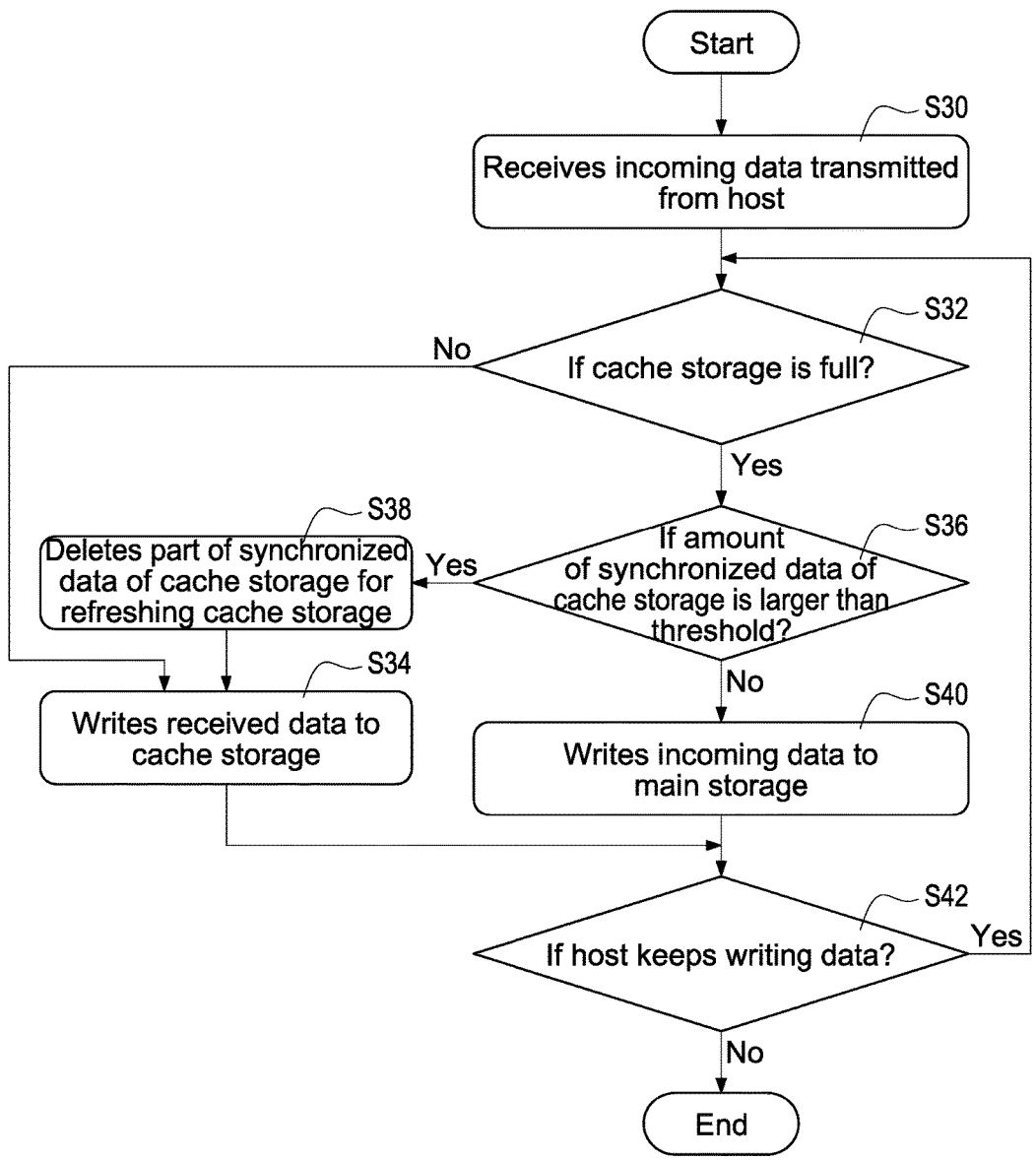
FIG. 4 is an accessing flowchart of cache storage of a second embodiment according to the present invention.

FIG. 4 is an accessing flowchart of cache storage of a second embodiment according to the present invention. The difference between the second embodiment and the aforementioned first embodiment is that the second embodiment further provides an accessing approach after the cache storage 23 is full.

As shown in FIG. 4, the hybrid HDD 2 first receives, through the bridge unit 21, the incoming data transmitted from the host 1 (step S30), next, it determines if the cache storage 23 is full or not (step S32). If the cache storage 23 is not full yet, the bridge unit 21 directly writes the received data to the cache storage 23 (step S34) in order to transform the received data into part of the saved data 31 of the cache storage 23.

It should be mentioned that in the present invention, the cache storage 23 adopts the first in first out (FIFO) protocol, so the new written data will become a new part of the saved data 31 by pushing an old part of the saved data 31, and the old part of the saved data 31 may then exceed the threshold capacity 231 due to the push. Therefore, the old part of the saved data 31 that exceeds the threshold capacity 231 will be synchronously stored to the main storage 22 and transformed into a new part of the synchronized data 32 of the cache storage 23.

If the cache storage 23 is determined as full in the step S32, the hybrid HDD 2 then determines, through the cache controlling unit 25, if an amount of the synchronized data 32 of the cache storage 23 is larger than a threshold (step S36). If the amount of the synchronized data 32 is larger than the threshold, the cache controlling unit 25 controls the cache storage 23 to delete part of the synchronized data 32 of the cache storage 23 for refreshing the cache storage 23 (step S38). Because the refreshed cache storage 23 is not full anymore, the bridge unit 21 can then write the received data to the refreshed cache storage 23 (step S34).

It should be mentioned that the cache controlling unit 25 can record usage rate of the synchronized data 32 of the cache storage 23 during the usage of the hybrid HDD 2, i.e., the cache controlling unit 25 records the frequency the host 1 reads the synchronized data 32 of the cache storage 23. Also, in the aforementioned step S38, the cache controlling unit 25 retains part of the synchronized data 32 of the cache storage 23 that has a usage rate higher than a preset value, and first deletes other part of the synchronized data 32 of the cache storage 23 that has a lower usage rate. Therefore, the hit rate that the host 1 can find necessary data precisely in the cache storage 23 increases, and the accessing frequency of the main storage 22 decreases, so as to extend the life of the main storage 22 and to increase the data accessing speed of the entire hybrid HDD 2.

In this embodiment, the time cost the bridge unit 21 writes data to the cache storage 23 is different from that the cache storage 23 synchronously stores data to the main storage 22. Taking DDR SDRAM for an instance, the average speed of the bridge unit 21 in writing data to the cache storage 23 is about 200K IOPS to 260K IOPS, and takes SSD for other instance, the average speed of the cache storage 23 in synchronously storing data to the main storage 22 is about 20K IOPS to 100K IOPS. As a result, if the cache storage 23 simultaneously processes the saved data 31 and the synchronized data 32, the speed of transforming the received data into the saved data 31 is much faster than the speed of transforming part of the saved data 31 into the synchronized data 32.

As mentioned above, if the cache storage 23 is full and the amount of the synchronized data 32 of the cache storage 23 is smaller than the threshold, it indicates that the cache storage 23 is not faster enough to synchronously store the saved data 31 to the main storage 22. Consequently, the bridge unit 21 will then write the incoming data from the host 1 directly to the main storage 22 (step S40). Therefore, the bridge unit 21 creates buffer time for the cache storage 23 to transform part of the saved data 31 into part of the synchronized data 32, so as to allow the following data from the host 1 to be written directly to the cache storage 23 instead of the main storage 22 afterwards.

It should be mentioned that the above threshold can be a minimal length of a command transmitted by the host 1. If the amount of the synchronized data 32 is smaller than the minimal length of the command transmitted by the host 1, it indicates that the cache storage 23 does not have enough gap (i.e., space that storing the synchronized data 32 that can be deleted), so the incoming data from the host 1 will be directly written to the main storage 22 instead of the full cache storage 23.

Next, the hybrid HDD 2 determines if the host 1 keeps writing data (step S42). If the host 1 does keep writing, the method goes back to the step S32, and the hybrid HDD 2 keeps writing the incoming data to the cache storage 23 or the main storage 22. If the host 1 stops writing, the method ends. It should be mentioned that even the determination in the step S42 is negative, but if the data synchronizing procedure of the cache storage 23 is not completed yet, the cache controlling unit 25 will keep controlling the cache storage 23 to execute the data synchronizing procedure until it is done.

According to the application's experiment result, if the cache storage 23 is full of the saved data 31 and the synchronized data 32 (total utility rate is 100%), the calculation of reading hit rate that the host 1 reads the hybrid HDD 2 and finds necessary data in the cache storage 23 is:

$$\frac{\text{total capacity of the cache storage 23}}{\text{total capacity of the mainstorage 22}},$$

and the calculation of writing hit rate is:

$$\left(\frac{\text{total capacity of the cache storage 23}}{\text{total capacity of the main storage 22}}\right)+$$

probability that the synchronized data 32 exists.

For an instance, if the total capacity of the cache storage 23 is 64 GB, and the total capacity of the main storage 22 is 256 GB, the reading hit rate is about 25%

$$\left(\frac{64 \text{ GB}}{256 \text{ GB}}\right),$$

and the writing hit rate is depend on the probability that the synchronized data 32 exists in the cache storage 23.

In particularly, the probability that the synchronized data 32 exists in the cache storage 23 relates to the density of the commands transmitted from the host 1 (i.e., whether data is written continuously or not), and also relates to the difference between the writing speed of the main storage 22 and the writing speed of the cache storage 23. Anyway, as data can be written to the cache storage 23 (for example, the cache storage 23 is not full yet, or the cache storage 23 is full but the amount of the synchronized data 32 is larger than the threshold) in the present invention, it will be regarded as hit.

Accordingly, the average number of IOPS of the hybrid HDD 2 of the present invention in random accessing process can be further calculated by the following formula:

(20K–100K)×miss rate×efficiency of the bridge unit 21+(200K–260K)×hit rate

In this case, the miss rate is (100%—hit rate), and the efficiency of the bridge unit 21 is the ratio of speed decreasing caused by the bridge unit 21.

For an instance, the writing speed of the host 1 to directly write 4K Byte data to the main storage 22 is about 101K IOPS, and the writing speed of the host 1 to write 4K Byte data to the main storage 22 though the bridge unit 21 is about 90.5K IOPS, therefore, the speed decreasing ratio can be calculated as 0.896 (which is caused by the bridge unit 21), it indicates that the efficiency of the bridge unit 21 is 0.896.

Figure 5A:
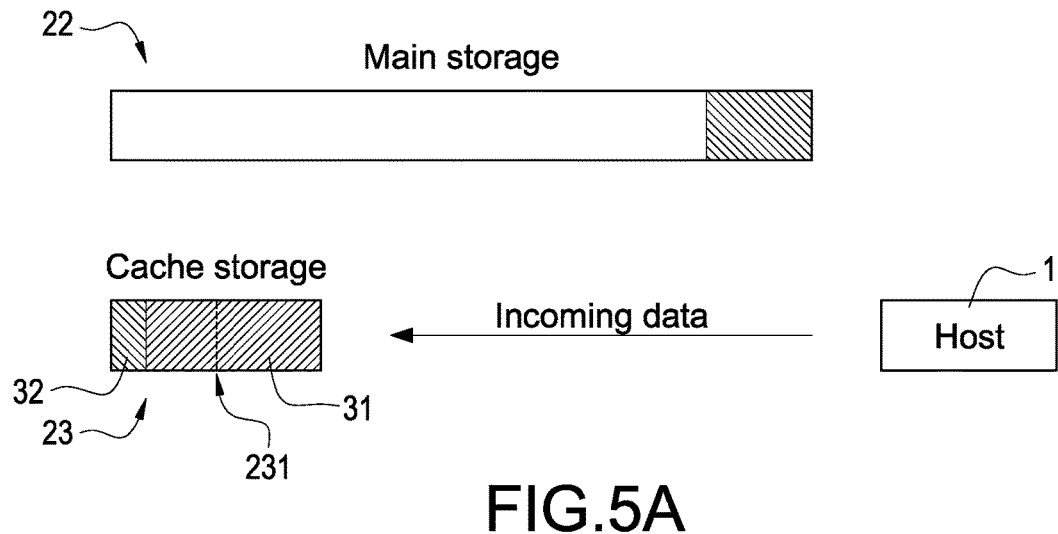
FIG. 5A is a first schematic view showing data writing of a second embodiment according to the present invention.
Figure 5B:
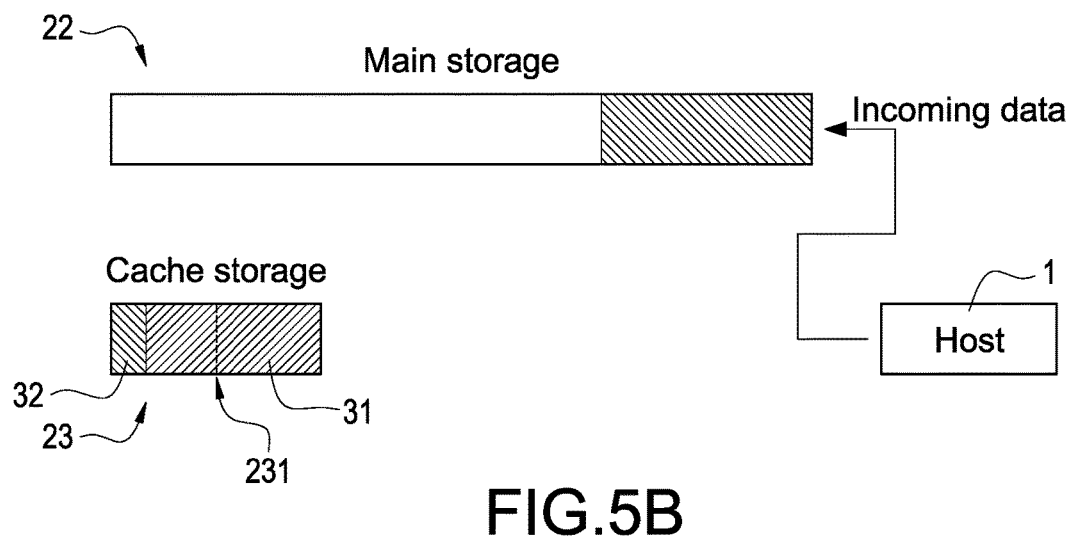
FIG. 5B is a second schematic view showing data writing of the second embodiment according to the present invention.

FIG. 5A is a first schematic view showing data writing of a second embodiment according to the present invention. FIG. 5B is a second schematic view showing data writing of the second embodiment according to the present invention. As shown in FIG. 5A, when the host 1 wants to write data to the hybrid HDD 2, the hybrid HDD 2 first writes the incoming data to the cache storage 23. However, if the cache storage 23 is full at the time, the hybrid HDD 2 will perform the determination described in the aforementioned step S36 through the cache controlling unit 25.

As shown in FIG. 5B, if the cache storage 23 is full and the amount of the synchronized data 32 is smaller than the threshold (i.e., the speed of the cache storage 23 in executing the data synchronizing procedure is much slower than the speed of the hybrid HDD 2 in executing the data writing procedure), the bridge unit 21 will directly write the incoming data transmitted from the host 1 to the main storage 22 instead of the cache storage 23.

The present invention presets the threshold capacity 231. The cache storage 23 first synchronously stores part of the saved data 31 that exceeds the threshold capacity 231 to the main storage 22 before it is full, and first deletes part of the synchronized data 32 after it is full. Therefore, the hit rate that the incoming data can be directly written to the cache storage 23 is increased, the accessing frequency of the main storage 22 that accessed by the host 1 is decreased, and the accessing speed of the entire hybrid HDD 2 is also upgraded simultaneously.

As the skilled person will appreciate, various changes and modifications can be made to the described embodiment. It is intended to include all such variations, modifications and equivalents which fall within the scope of the present invention, as defined in the accompanying claims.

What is claimed is:

1. An accessing method for accessing hybrid hard-disk drive, the hybrid hard-disk drive (HDD) comprising a main storage and a cache storage, and the accessing method comprising:
    a) receiving incoming data from a host, the hybrid HDD connected with the host and receiving the incoming data through a main bus;
    b) writing the received data to the cache storage for being a saved data in the cache storage, wherein the cache storage is composed of volatile memories;
    c) determining if a capacity of the saved data exceeds a threshold capacity of the cache storage;
    d) synchronously storing only part of the saved data that exceeds the threshold capacity to the main storage for transforming into synchronized data in the cache storage if the capacity of the saved data does exceed the threshold capacity;
    e) determining if the cache storage is full;
    f) deleting part of the synchronized data in the cache storage for refreshing the cache storage if the cache storage is full; and
    g) writing the incoming data from the host to the refreshed cache storage that part of the synchronized data is already deleted.

2. The accessing method in claim 1, wherein the cache storage writes the incoming data through first in first out (FIFO) protocol.

3. The accessing method in claim 1, wherein the cache storage records a usage rate of the synchronized data, and in the step f, the cache storage retains part of the synchronized data having the usage rate higher than a preset value.

4. The accessing method in claim 1, further comprising following steps:
    h) determining if the cache storage is full;
    i) determining if an amount of synchronized data of the cache storage is larger than a threshold if the cache storage is full; and
    j) deleting part of the synchronized data of the cache storage for refreshing the cache storage and writing the incoming data to the refreshed cache storage if the amount of the synchronized data is larger than the threshold.

5. The accessing method in claim 4, further comprising a step k) after the step i, writing the incoming data to the main storage directly if the amount of the synchronized data is smaller than the threshold.

6. The accessing method in claim 1, wherein the main storage is solid state disk (SSD), and the cache storage is composed of double data rate synchronous dynamic random access memories (DDR SDRAM).

7. The accessing method in claim 1, wherein the threshold capacity is half of a total capacity of the cache storage.

8. The accessing method in claim 1, wherein the hybrid HDD comprises a bridge unit and a cache controlling unit, the bridge unit is connected with the host for receiving the incoming data through the main bus, and the bridge unit is connected with the main storage and the cache storage respectively through two device buses for respectively writing the incoming data to the main storage or the cache storage, the cache controlling unit is connected with the cache storage for controlling the cache storage to synchronously store the saved data to the main storage and to delete part of the synchronized data of the cache storage.

9. The accessing method in claim 8, wherein the main bus and the two device buses are serial advanced technology attachment (SATA) buses.

\* \* \* \* \*